United States Patent
Zheng et al.

(10) Patent No.: US 12,458,245 B2
(45) Date of Patent: Nov. 4, 2025

(54) MAGNETIC RESONANCE IMAGING SYSTEM AND CORRECTION METHOD THEREOF

(71) Applicant: GE Precision Healthcare LLC, Wauwatosa, WI (US)

(72) Inventors: Yanchun Zheng, Beijing (CN); Kun Wang, Beijing (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 188 days.

(21) Appl. No.: 18/295,826

(22) Filed: Apr. 4, 2023

(65) Prior Publication Data
US 2023/0346244 A1   Nov. 2, 2023

(30) Foreign Application Priority Data
Apr. 29, 2022   (CN) .......................... 202210465450.2

(51) Int. Cl.
| | |
|---|---|
| *A61B 5/055* | (2006.01) |
| *G01R 33/20* | (2006.01) |
| *G01R 33/34* | (2006.01) |
| *G01R 33/385* | (2006.01) |
| *G01R 33/44* | (2006.01) |
| *G01R 33/46* | (2006.01) |
| *G01R 33/48* | (2006.01) |
| *G01R 33/50* | (2006.01) |
| *G01V 3/00* | (2006.01) |
| *G16H 40/63* | (2018.01) |
| *G16H 30/20* | (2018.01) |

(52) U.S. Cl.
CPC ............. *A61B 5/055* (2013.01); *G16H 40/63* (2018.01); *G16H 30/20* (2018.01)

(58) Field of Classification Search
CPC ...... G01R 33/20; G01R 33/34; G01R 33/385; G01R 33/3875; G01R 33/44; G01R 33/46; G01R 33/48; G01R 33/50; G01R 33/561; G01R 33/565; A61B 5/055; G01V 3/00
See application file for complete search history.

(56) References Cited

U.S. PATENT DOCUMENTS

| | | | |
|---|---|---|---|
| 8,797,032 B2 | 8/2014 | Masashi | |
| 2011/0085722 A1* | 4/2011 | Feiweier | .......... G01R 33/56518 324/309 |
| 2015/0241539 A1* | 8/2015 | Kaneko | ................ G01R 33/385 324/322 |
| 2018/0275237 A1* | 9/2018 | Feinberg | ............... A61B 5/7285 |
| 2019/0383894 A1* | 12/2019 | Liu | ..................... A61B 5/055 |
| 2023/0042314 A1* | 2/2023 | Shih | ...................... G01R 33/48 |

FOREIGN PATENT DOCUMENTS

| | | | | |
|---|---|---|---|---|
| CN | 101034149 A | | 9/2007 | |
| KR | 20150140228 | * | 12/2015 | ............. A61B 5/055 |

* cited by examiner

*Primary Examiner* — Neel D Shah (57) ABSTRACT

A magnetic resonance imaging system includes a processor. The processor is configured to acquire a variation of a first system state parameter during a scanning process of the magnetic resonance imaging system, determine, according to the variation of the first system state parameter, a variation of a second system state parameter on the basis of a function relationship between the first system state parameter and the second system state parameter, and correct the magnetic resonance imaging system on the basis of the variation of at least one of the first system state parameter and the second system state parameter.

11 Claims, 4 Drawing Sheets

MAGNETIC RESONANCE IMAGING SYSTEM AND CORRECTION METHOD THEREOF

CROSS REFERENCE

The present application claims priority and benefit of Chinese Patent Application No. 202210465450.2 filed on Apr. 29, 2022, which is incorporated herein by reference in its entirety.

FIELD OF THE INVENTION

The present invention relates to medical imaging technologies, and more specifically, to a magnetic resonance imaging system and a correction method thereof, and a non-transitory computer-readable storage medium.

BACKGROUND OF THE INVENTION

Magnetic resonance imaging (MRI), as a medical imaging modality, can obtain images of the human body without using X-rays or other ionizing radiation. MRI utilizes a magnet having a strong magnetic field to generate a main magnetic field B0. When a part to be imaged in the human body is positioned in the main magnetic field B0, nuclear spins associated with hydrogen nuclei in human tissue are polarized, so that the tissue of the part to be imaged generates a longitudinal magnetization vector at a macroscopic level. After a radio-frequency field B1 intersecting the direction of the main magnetic field B0 is applied, the direction of rotation of protons changes so that the tissue of the part to be imaged generates a transverse magnetization vector at a macroscopic level. After the radio-frequency field B1 is removed, the transverse magnetization vector decays in a spiral manner until it is restored to zero. A free induction decay signal is generated during decay. The free induction decay signal can be acquired as a magnetic resonance signal, and a tissue image of the part to be imaged can be reconstructed based on the acquired signal. A gradient system is configured to transmit a layer selection gradient pulse, a phase-coded gradient pulse, and a frequency-coded gradient pulse (also referred to as a read-out gradient pulse) to provide three-dimensional position information for the aforementioned magnetic resonance signal to implement image reconstruction.

During magnetic resonance imaging scanning, particularly for a long scan sequence, the temperature of the entire system significantly increases, which not only affects the temperature in a scanner bore and further affects a scanned subject, but also affects a change in an eddy current, a change in a B0 field, etc., in the magnetic resonance imaging system, causing a large error in acquired data. As a result, system performance gradually deteriorates over time in the long scan sequence, and the quality of a reconstructed image also degrades over time.

BRIEF DESCRIPTION OF THE INVENTION

Provided in the present invention are a magnetic resonance imaging system and a correction method thereof, and a non-transitory computer-readable storage medium.

An exemplary embodiment of the present invention provides a magnetic resonance imaging system, comprising a processor. The processor is configured to acquire a variation of a first system state parameter during a scanning process of the magnetic resonance imaging system; determine, according to the variation of the first system state parameter, a variation of a second system state parameter on the basis of a function relationship between the first system state parameter and the second system state parameter; and correct the magnetic resonance imaging system on the basis of the variation of at least one of the first system state parameter and the second system state parameter.

Specifically, the system state parameters comprise an eddy current, a gradient delay, a phase shift, a gradient temperature, a specific absorption rate, a main magnetic field, and a center frequency, the first system state parameter is any one of the system state parameters, and the second system state parameter is another of the system state parameters.

Specifically, the first system state parameter comprises a center frequency, and the processor is further configured to: acquire a variation of the center frequency during the scanning process of the magnetic resonance imaging system, and determine, according to function relationships between the other system state parameters and the center frequency, variations of the other system state parameters.

Specifically, the acquiring a variation of the center frequency comprises: acquiring a reference center frequency, wherein the reference center frequency is a center frequency during pre-scanning; acquiring a center frequency of any layer during the scanning process of the magnetic resonance imaging system; and acquiring the variation of the center frequency based on the difference between the center frequency of the any layer and the reference center frequency.

Specifically, the function relationship between the first system state parameter and the second system state parameter is linear or non-linear.

Specifically, the function relationship is saved in the magnetic resonance imaging system.

Specifically, the variation of at least one of the first system state parameter and the second system state parameter is displayed on a display unit of the magnetic resonance imaging system.

An exemplary embodiment of the present invention further provides a correction method of a magnetic resonance imaging system. The method comprises acquiring a variation of a first system state parameter during a scanning process of the magnetic resonance imaging system; determining, according to the variation of the first system state parameter, a variation of a second system state parameter on the basis of a function relationship between the first system state parameter and the second system state parameter; and correcting the magnetic resonance imaging system on the basis of the variation of at least one of the first system state parameter and the second system state parameter.

Specifically, the acquiring a variation of a first system state parameter comprises acquiring a variation of a center frequency and determining, according to function relationships between the other system state parameters and the center frequency, variations of the other system state parameters.

An exemplary embodiment of the present invention further provides a non-transitory computer-readable storage medium for storing a computer program. When executed by a computer, the computer program causes the computer to perform an instruction of the correction method of a magnetic resonance imaging system described above.

Other features and aspects will become apparent from the following detailed description, accompanying drawings, and claims.

BRIEF DESCRIPTION OF THE DRAWINGS

The present invention can be better understood through the description of exemplary embodiments of the present invention in conjunction with the accompanying drawings, in which.

DETAILED DESCRIPTION

Specific embodiments of the present invention will be described below. It should be noted that in the specific description of these embodiments, for the sake of brevity and conciseness, this specification may not describe all features of the actual embodiments in detail. It should be understood that in the actual implementation process of any embodiments, just as in the process of any engineering project or design project, a variety of specific decisions are often made to achieve specific goals of the developer and to meet system-related or business-related constraints, which may also vary from one embodiment to another. Furthermore, it should also be understood that although efforts made in such development processes may be complex and tedious, for those of ordinary skill in the art related to the content disclosed in the present invention, some design, manufacture, or production changes based on the technical content disclosed in the present disclosure are only common technical means, and should not be construed as insufficient content of the present disclosure.

Unless defined otherwise, technical terms or scientific terms used in the claims and specification should have usual meanings understood by those of ordinary skill in the technical field to which the present invention belongs. The terms "first," "second," and similar terms used in the description and claims of the patent application of the present invention do not denote any order, quantity, or importance, but are merely intended to distinguish between different constituents. The terms "one" or "a/an" and similar terms do not denote a limitation of quantity, but rather the presence of at least one. The terms "include" or "comprise" and similar terms mean that an element or article preceding the term "include" or "comprise" encompasses elements or articles and their equivalent elements listed after "include" or "comprise," and does not exclude other elements or articles. The terms "connect" or "connected" and similar words are not limited to physical or mechanical connections, and are not limited to direct or indirect connections.

Figure 1:
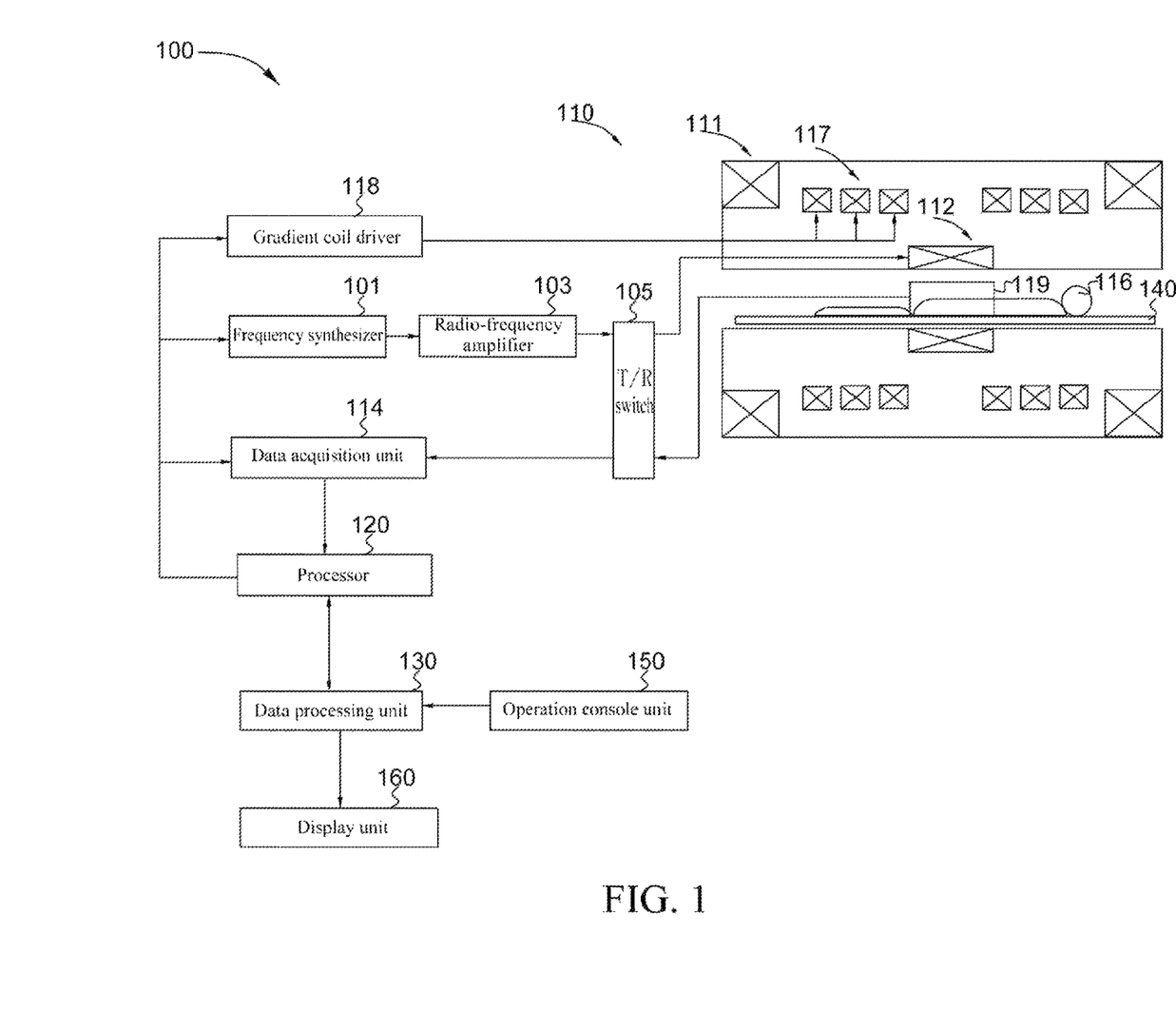
FIG. 1 is a schematic diagram of a magnetic resonance imaging system according to some embodiments of the present invention.

FIG. 1 is a schematic diagram of an MRI system 100 according to some embodiments of the present invention. As shown in FIG. 1, the MRI system 100 includes a scanner 110, a processor 120, and a data processing unit 130. The MRI system 100 is described only as an example. In other embodiments, the MRI system 100 may have various variations, as long as image data can be acquired from a subject under examination.

The scanner 110 may be configured to acquire data of the subject under examination 116. The processor 120 is coupled to the scanner 110 to control an operation of the scanner 110. The scanner 110 may include a main magnet 111, a radio frequency transmit coil 112, a radio frequency transmit link (not shown in the figure), a gradient coil system 117, a gradient coil driver 118, and a radio frequency receive coil 119.

The main magnet 111 generally includes, for example, an annular superconducting magnet. The annular superconducting magnet is mounted in an annular vacuum container. The annular superconducting magnet defines a cylindrical space surrounding the subject under examination 116, i.e., a scanner bore (bore). The main magnet 111 may generate a constant main magnetic field such as a main magnetic field B0 in a Z direction of the cylindrical space. The MRI system 100 uses the generated main magnetic field B0 to emit a magnetostatic pulse signal to the subject under examination 116 who is placed in an imaging space, so that precession of protons in the body of the subject under examination 116 is ordered to generate a longitudinal magnetization vector.

The radio frequency transmit link includes a frequency synthesizer 101, a radio-frequency amplifier 103, and a transmit/receive (T/R) switch 105.

The frequency synthesizer 101 is configured to generate a radio frequency pulse. The radio frequency pulse may include a radio frequency excitation pulse. The radio frequency excitation pulse is amplified by the radio-frequency amplifier 103 and is then applied to the radio frequency transmit coil 112 by the T/R switch 105, so that the radio frequency transmit coil 112 emits to the subject under examination 116 a radio frequency magnetic field B1 orthogonal to the main magnetic field B0 so as to excite nuclei in the body of the subject under examination 116, and the longitudinal magnetization vector is converted into a transverse magnetization vector. After the end of the radio frequency excitation pulse, a free induction decay signal, i.e., a magnetic resonance signal that can be acquired, is generated during the process in which the transverse magnetization vector of the subject under examination 116 gradually returns to zero.

The radio frequency transmit coil 112 may be a body coil, wherein the body coil may be connected to the T/R switch 105. Through control of the T/R switch, the body coil can be switched between a transmit mode and a receive mode. In the receive mode, the body coil may be configured to receive a magnetic resonance signal from the subject under examination 116. In addition, the radio frequency transmit coil 112 may also be a local coil, such as a head coil.

In some embodiments, the radio frequency transmit coil is not limited to the body coil and local coil mentioned in the present application, and may also include other appropriate types of coils. The radio frequency receive coil is also not limited to the body coil, local coil, and surface coil mentioned in the present application, and may also include other appropriate types of coils.

The gradient coil system 117 forms a magnetic field gradient in the imaging space so as to provide three-dimensional position information for the magnetic resonance signal described above. The magnetic resonance signal may be received by the radio frequency receive coil 119, or by the body coil or the local coil in the receive mode. The data processing unit 130 may process the received magnetic resonance signal so as to obtain a required image or image data.

Specifically, the gradient coil system 117 may include three gradient coils. Each of the three gradient coils generates a gradient magnetic field inclined to one of three spatial axes (e.g., X-axis, Y-axis, and Z-axis) which are perpendicular to one another, and generates a gradient field according to imaging conditions in each of a slice selection direction, a phase-encoding direction, and a frequency-encoding direction. More specifically, the gradient coil system 117 applies a gradient field in the slice selection direction of the subject under examination 116 so as to select a slice. The radio frequency transmit coil 112 emits a radio frequency excitation pulse to the slice selected for the subject under examination 116 and excites the slice. The gradient coil system 117 also applies a gradient field in the phase-encoding direction of the subject under examination 116 so as to perform phase encoding on a magnetic resonance signal of the excited slice. The gradient coil system 117 then applies a gradient field in the frequency-encoding direction of the subject under examination 116 so as to perform frequency encoding on the magnetic resonance signal of the excited slice.

The gradient coil driver 118 is configured to provide suitable power signals for the aforementioned three gradient coils, respectively, in response to a sequence control signal transmitted by the processor 120.

The scanner 110 may further include a data acquisition unit 114. The data acquisition unit 114 is configured to acquire the magnetic resonance signal received by the radio frequency surface coil 119 or the body coil. The data acquisition unit 114 may include, for example, a radio frequency preamplifier (not shown), a phase detector (not shown), and an analog-to-digital converter (not shown), wherein the radio frequency preamplifier is configured to amplify the magnetic resonance signal received by the radio frequency surface coil 119 or the body coil. The phase detector is configured to perform phase detection on the amplified magnetic resonance signal. The analog-to-digital converter is configured to convert the magnetic resonance signal on which the phase detection has been performed from an analog signal to a digital signal. The data processing unit 130 can perform processing such as calculation and reconstruction on the digitized magnetic resonance signal so as to acquire a medical image.

The data processing unit 130 may include a computer and a storage medium. A program of predetermined data processing, the program being executable by the computer, is recorded on the storage medium. The data processing unit 130 may be connected to the processor 120 and perform data processing based on a control signal received from the processor 120. The data processing unit 130 may also be connected to the data acquisition unit 114 to receive a magnetic resonance signal outputted by the data acquisition unit 114, so as to perform the aforementioned data processing.

The processor 120 may include a computer and a storage medium, wherein the storage medium is used to store a program executable by the computer, and when the computer executes the program, a plurality of components of the scanner 110 are enabled to implement operations corresponding to the aforementioned imaging sequence. The data processing unit 130 may also be caused to perform predetermined data processing. In some embodiments, the processor 120 may acquire corresponding system state parameters, for example, a center frequency and a variation thereof, during a process of executing the imaging sequence.

The storage medium of the processor 120 and the data processing unit 130 may include, for example, a ROM, a floppy disk, a hard disk, an optical disk, a magneto-optical disk, a CD-ROM, or a non-volatile memory card.

The processor 120 may be set and/or arranged for use in different manners. For example, in some implementations, a single processor 120 may be used. In other implementations, a plurality of processors 120 are configured to work together (e.g., based on distributed processing configuration) or separately, where each processor 120 is configured to handle a specific aspect and/or function, and/or to process data used to generate a model used only for a specific medical imaging system 100. In some implementations, the processor 120 may be local (e.g., in the same place as one or a plurality of medical imaging systems 100, for example, in the same facility and/or the same local network). In other implementations, the processor 120 may be remote and thus can only be accessed via a remote connection (e.g., via the Internet or other available remote access technologies). In a specific implementation, the processor 120 may be configured in a manner similar to cloud technology, and may be accessed and/or used in a manner substantially similar to the manner of accessing and using other cloud-based systems.

The MRI system 100 further includes an examination table 140 configured to hold and/or move the subject under examination 116. The subject under examination 116 may be moved into or out of the imaging space by moving the examination table 140 on the basis of a control signal from the processor 120.

The MRI system 100 further includes an operation console unit 150 which is connected to the processor 120. The operation console unit 150 may send the acquired operation signal to the processor 120 so as to control operating states of the aforementioned components, for example, the examination table 140 and the scanner 110. The operation signal may include, for example, a scanning protocol and a parameter that are selected manually or automatically. The scanning protocol may include the aforementioned imaging sequence. In addition, the operation console unit 150 may transmit the acquired operation signal to the processor 120 to control the data processing unit 130, so as to obtain a desired image.

The operation console unit 150 may include a user input device such as a keyboard, a mouse, a voice-activated controller, or any other suitable input devices, by which an operator may input an operation signal/control signal to the processor 120.

The MRI system 100 may further include a display unit 160 that may be connected to the operation console unit 150 to display an operation interface and may further be connected to the data processing unit 130 to display the image. In some embodiments, the display unit 160 is used to display a variation of one or a plurality of system state parameters and a corresponding correction parameter.

In some embodiments, the system 100 may be connected, via one or more configurable wired and/or wireless networks such as the Internet and/or a virtual private network, to one or more display units, cloud networks, printers, workstations, and/or similar apparatuses located locally or remotely.

During a scanning process of a magnetic resonance imaging system, particularly for long scanning, the temperature of the magnetic resonance imaging system, especially the temperature of a gradient system, greatly rises as scanning time increases. The system temperature rise results in a series of impacts, which further leads to quality degradation of a reconstructed image, such as the appearance of artifacts. Even if image optimization or image processing can be performed to remove artifacts or perform other operations, the image optimization operation increases the calculation amount of a processor, and has a limited optimization effect. The foregoing operation does not address the problem at the source.

The system temperature rise causes many parameters to change during the scanning process, for example, causes an eddy current, leading to problems such as a gradient delay. However, for the magnetic resonance imaging system, it is difficult to directly acquire a change of the eddy current and a variation of the gradient delay or other parameters through an existing system component and/or processor. Therefore, real-time acquisition or real-time monitoring of system state parameters is also a problem to be solved.

The present invention proposes a system, and a method for acquiring a variation of a system state parameter and correcting a system on the basis of the variation, to solve problems caused by a system temperature rise, such as system instability and image artifacts.

In some embodiments, system state parameters include an eddy current (Eddy Current), a gradient delay, a phase shift, a gradient temperature, a specific absorption rate (Specific Absorption Rate, SAR), a main magnetic field (a B0 field), and a center frequency.

The system state parameters described above may each be represented by a function relationship related to a gradient activity (G). For example, the center frequency is represented by $cf=F_0(G)$, that is, the center frequency may be represented by a function $F_0$ related to the gradient activity G, the main magnetic field is represented by $B0=F_1(G)$, the eddy current is represented by $EddyCurrent=F_2(G)$, the gradient delay is represented by $GradDelay=F_3(G)$, the phase shift is represented by $PhaseShift=F_4(G)$, the gradient temperature is represented by $Temperature=F_5(G)$, and a value of the SAR is represented by $SAR=F_6(G)$. Certainly, the system state parameters may further include other parameters, and the relationships between the other parameters and the gradient activity may also be represented by other function relationships. The term "gradient activity" refers to a performance metric of a gradient system, including parameters such as gradient intensity.

Specifically, taking the center frequency as an example, function relationships between the system state parameters and the center frequency can be obtained by using the function relationships described above. For example, by using the function relationships of $cf=F_0(G)$ and $B0=F_1(G)$, a function relationship between the B0 field and the center frequency, namely, $B0=F_1(F_0^{-1}(cf))$, can be obtained. Likewise, $EddyCurrent=F_2(F_0^{-1}(cf))$ for the eddy current, $GradDelay=F_3(F_0^{-1}(cf))$ for the gradient delay, $PhaseShift=F_4(F_0^{-1}(cf))$ for the phase shift, $Temperature=F_5(F_0^{-1}(cf))$ for the gradient temperature, and $SAR=F_6(F_0^{-1}(cf))$ for the value of the SAR can be obtained. Therefore, a function relationship between any two system state parameters can be obtained. The foregoing function relationship may be linear or non-linear. For example, the function relationship may be an exponential relationship, a logarithmic relationship, or a triangular function relationship.

One of the system state parameters may be selected as an indicator, and the other system state parameters may be monitored based on function relationships between the indicator and the other parameters. For example, for any system state parameter, if a real-time variation of the system state parameter is known, variations of the other parameters can be calculated based on corresponding function relationships.

The present invention proposes a magnetic resonance imaging system, including a processor. The processor is configured to acquire a variation of a first system state parameter during a scanning process of the magnetic resonance imaging system, determine, according to the variation of the first system state parameter, a variation of a second system state parameter on the basis of a function relationship between the first system state parameter and the second system state parameter, and correct the magnetic resonance imaging system on the basis of the variation of at least one of the first system state parameter and the second system state parameter.

Specifically, the first system state parameter is any one of an eddy current, a gradient delay, a phase shift, a gradient temperature, a specific absorption rate, a main magnetic field, and a center frequency, and the second system state parameter is another of the eddy current, the gradient delay, the phase shift, the gradient temperature, the specific absorption rate, the main magnetic field, and the central frequency, except the first system state parameter.

In some embodiments, the first system state parameter is the center frequency, and the second system state parameter is one of the eddy current, the gradient delay, the phase shift, the gradient temperature, the specific absorption rate, and the main magnetic field. In some embodiments, the center frequency in the system state parameters is selected as an indicator to obtain variations of the other state parameters. Specifically, in the system state parameters described above, the value of the center frequency and a change of the center frequency are comparatively easily obtained and monitored. Therefore, the variations of the other state parameters may be obtained by acquiring function relationships between the other state parameters and the center frequency. Specifically, the processor is configured to acquire a variation of the center frequency during the scanning process of the magnetic resonance imaging system, and determine variations of the other system state parameters according to function relationships between the other system state parameters and the center frequency.

In some non-limiting embodiments, the variation of the center frequency can be obtained by using the difference between a center frequency acquired at any layer and a reference center frequency. Specifically, the reference center frequency is acquired, the reference center frequency being a center frequency during pre-scanning. The center frequency of the any layer during the scanning process of the magnetic resonance imaging system is acquired. The variation of the center frequency is acquired based on the difference between the center frequency of the any layer and the reference center frequency. Specifically, Fourier transform can be performed on a radio frequency signal received by the system, and further, a value of a current center frequency is obtained.

Specifically, the gradient system applies a gradient field in a slice selection direction to select a slice, and a radio frequency excitation pulse is transmitted to the slice to excite the slice. When a center frequency of the transmitted radio frequency pulse is equal to a precession frequency of protons, a layer position at which a subject under examination is excited is a midpoint of the gradient field. A radio frequency receive coil may receive a signal of the slice, perform Fourier transform on the received signal, and further obtain a value of a center frequency of the current slice. The center frequency of the any layer refers to a center frequency of received image data of any slice.

Certainly, the variation of the center frequency may alternatively be acquired by other means, and is not limited to the means described above.

Figure 2:
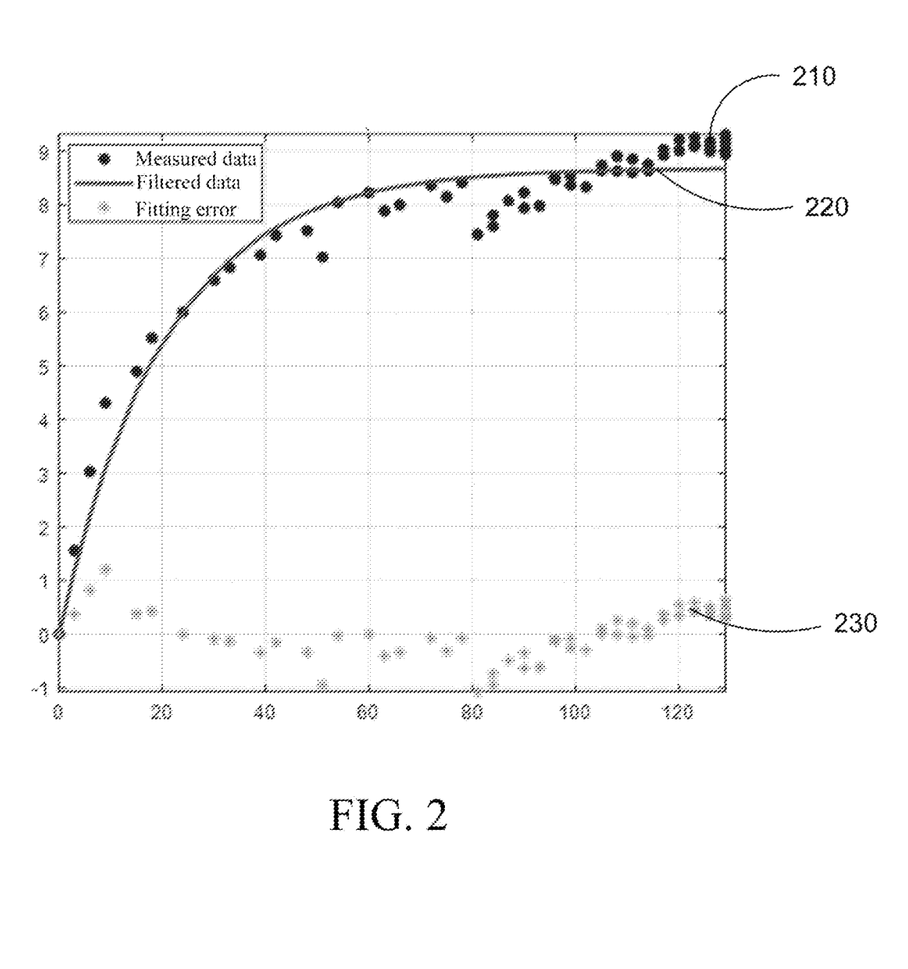
FIG. 2 is a diagram of a fitted curve between a phase shift and a center frequency according to some embodiments of the present invention.

FIG. 2 is a diagram of a fitted curve between a phase shift and a center frequency according to some embodiments of the present invention. As shown in FIG. 2, a horizontal coordinate is the variation of the center frequency, and a vertical coordinate is a variation of the phase shift. A plurality of points 210 show actually-measured variations of the corresponding phase shift at the variation of the center frequency. A curve 220 is a phase fitted curve. Points 230 show differences between fitted results and actual variations. It can be learned from the points 230 that the differences between the fitted variations of the phase shift and the actually-measured variations are very small. In other words, the variation of the phase shift obtained by using the function relationship is comparatively accurate.

In some non-limiting embodiments, a function relationship between the phase shift and the center frequency may be expressed as an exponential relationship, which is a non-linear function relationship.

The function relationship may be obtained by monitoring or acquiring and further fitting real-time values of the various system state parameters by using a particular scan sequence (a long scan sequence) in a development phase and/or a testing phase and/or a device installation phase. The real-time values of the various system state parameters may be directly measured by using external hardware, or may be obtained by calculation, or may be obtained by using a combination of other software and hardware.

In some embodiments, the function relationship may be acquired and stored in the magnetic resonance imaging system in the development phase and/or the testing phase and/or the device installation phase. The function relationship may be stored in the processor, or may be stored in another storage unit in the system. Specifically, the function relationship may be stored in the magnetic resonance imaging system in a form of a lookup table (Look Up Table, LUT).

In some embodiments, the variation of at least one of the first system state parameter and the second system state parameter is displayed on a display unit of the magnetic resonance imaging system. Specifically, the variation of the center frequency is displayed on the display unit 160. Certainly, variations of other system state parameters may also be displayed on the display unit. One or a plurality of the variations of the system state parameters can be displayed on the display unit in a variety of manners, such as a pop-up window or a parameter change indication. Further, the magnetic resonance imaging system can inform a user in another manner, for example, by using a sound or a voice indication.

In some non-limiting embodiments, the correcting the magnetic resonance imaging system may include compensating for a phase on the basis of the variation of the phase shift, or correcting the center frequency of the radio frequency pulse on the basis of the variation of the center frequency, or compensating for or correcting a scan parameter (or sequence) or an imaging parameter on the basis of the variation of another state parameter, etc.

Figure 3:
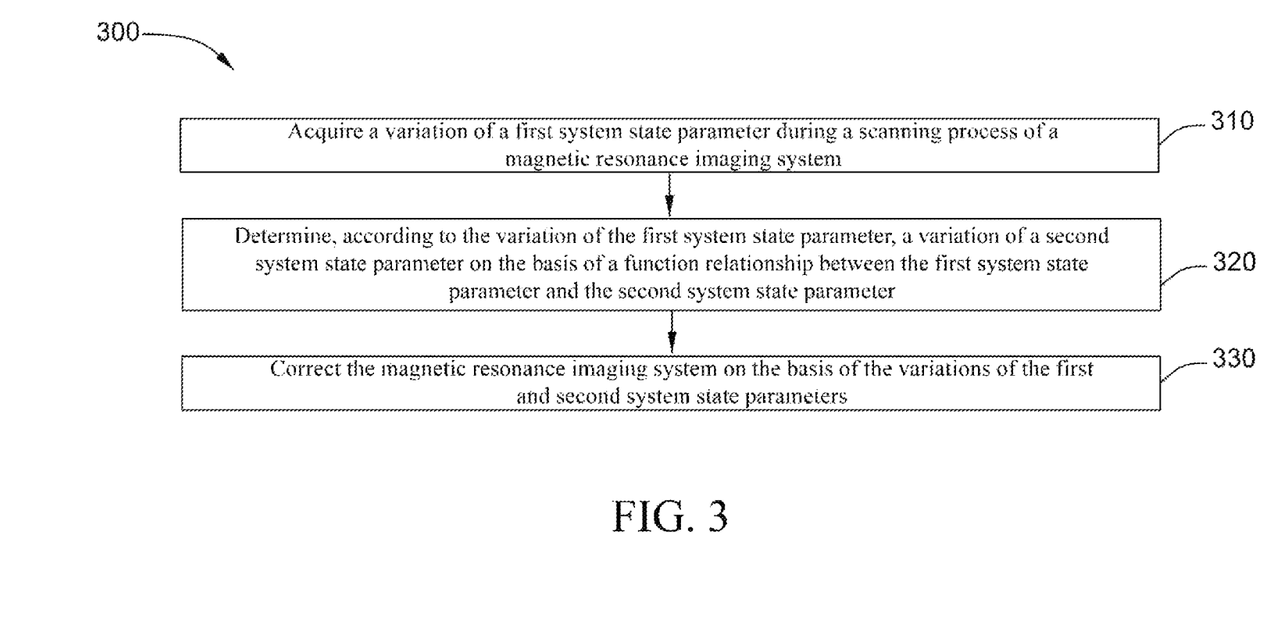
FIG. 3 is a flowchart of a correction method of a magnetic resonance imaging system according to some embodiments of the present invention.

FIG. 3 is a flowchart of a correction method 300 of a magnetic resonance imaging system according to some embodiments of the present invention. As shown in FIG. 3, the correction method 300 includes step 310, step 320, and step 330.

In step 310, a variation of a first system state parameter is acquired during a scanning process of the magnetic resonance imaging system.

In some embodiments, the system state parameters include an eddy current, a gradient delay, a phase shift, a gradient temperature, a specific absorption rate, a main magnetic field, and a center frequency.

In some embodiments, the center frequency is selected as an indicator to obtain variations of the other state parameters. Acquiring a variation of any one of the system state parameters includes acquiring a variation of the center frequency and determining, according to function relationships between the other system state parameters and the center frequency, variations of the other system state parameters.

Figure 4:
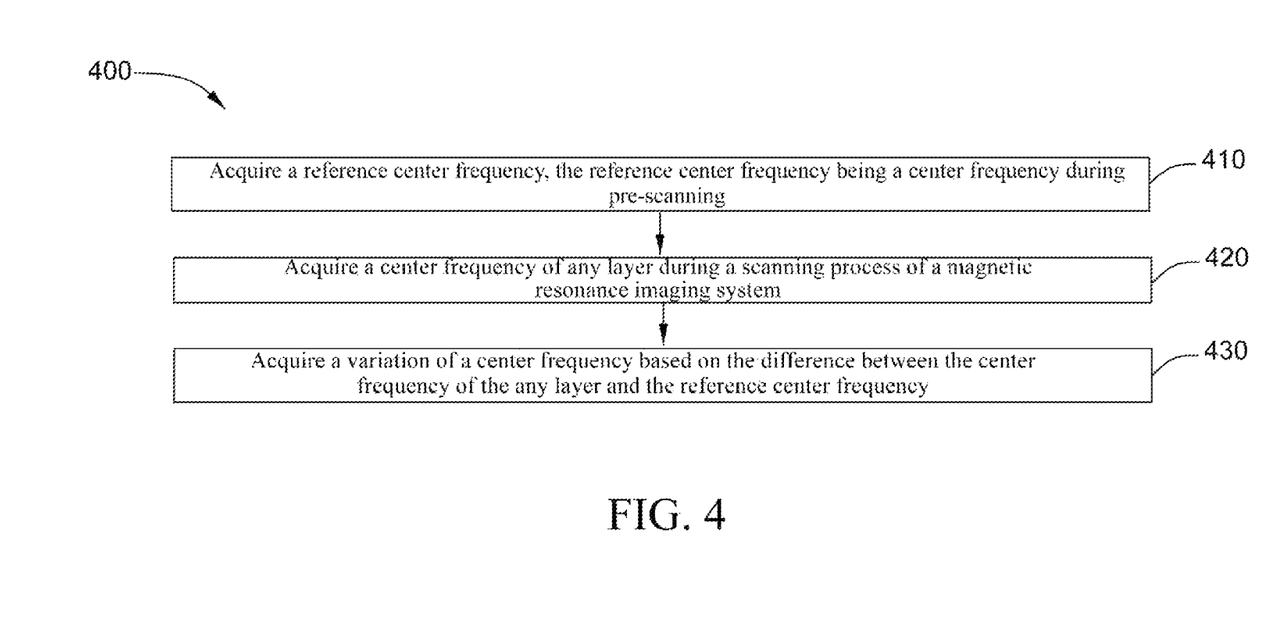
FIG. 4 is a flowchart of a method for acquiring a center frequency according to some embodiments of the present invention.

In some embodiments, the variation of the center frequency can be obtained by using the difference between a center frequency acquired at any layer and a reference center frequency. Specifically, FIG. 4 is a flowchart of a method 400 for acquiring a center frequency according to some embodiments of the present invention. As shown in FIG. 4, the acquisition method 400 includes step 410, step 420, and step 430.

In step 410, the reference center frequency is acquired, the reference center frequency being a center frequency during pre-scanning. Specifically, the center frequency may be obtained by performing Fourier transform on a received MR signal.

In step 420, the center frequency of the any layer during the scanning process of the magnetic resonance imaging system is acquired.

In step 430, the variation of the center frequency is acquired based on the difference between the center frequency of the any layer and the reference center frequency.

Returning to FIG. 3, in step 320, a variation of a second system state parameter is determined according to the variation of the first system state parameter on the basis of a function relationship between the first system state parameter and the second system state parameter.

In some embodiments, the function relationship between the first system state parameter and the second system state parameter is linear or non-linear. The function relationship may be acquired and stored in the magnetic resonance imaging system in a development phase and/or a testing phase and/or a device installation phase. The function relationship may be stored in a processor, or may be stored in another storage unit in the system. Specifically, the function relationship may be stored in the magnetic resonance imaging system in a form of a lookup table.

The function relationship may be acquired by monitoring or acquiring and further fitting real-time values of the various system state parameters by means of using a specific scan sequence (a long scan sequence) in the development phase and/or the testing phase and/or the device installation phase. The real-time values of the various system state parameters may be directly measured by using external hardware, or may be obtained by calculation, or may be obtained by using a combination of other software and hardware. The function relationship may alternatively be obtained based on other suitable manners.

In step 330, the magnetic resonance imaging system is corrected based on the variation of at least one of the first system state parameter and the second system state parameter.

In some embodiments, correcting the magnetic resonance imaging system may include compensating for a phase on the basis of a variation of the phase shift, or correcting a center frequency of a radio frequency pulse on the basis of the variation of the center frequency, etc.

Variations of the system state parameters are displayed on a display unit of the magnetic resonance imaging system. One or a plurality of the variations of the system state parameters can be displayed on the display unit in a variety of manners, such as a pop-up window or a parameter change indication. Further, the magnetic resonance imaging system can inform a user in another manner, for example, by using a sound or a voice indication.

In conclusion, according to the correction method of a magnetic resonance imaging system in some embodiments of the present invention, a function relationship between system state parameters is acquired in the development phase or the testing phase or the device installation phase, and is stored in the magnetic resonance imaging system. During an actual imaging scanning process, one of the system state parameters is selected and monitored, and a variation of each of the other system state parameters can be calculated based on the function relationship which is saved in the system, so that the system can be corrected based on the variations. In this way, not only is the problem of changes and variations of some system state parameters being difficult to monitor solved, but also problems caused by a temperature rise resulting from long scanning, such as image artifacts, can be solved. In addition, the user can be promptly informed by means of displaying or indication, in real time on the display unit, that one or a plurality of the system state parameters have changed.

The present invention may further provide a non-transitory computer-readable storage medium, for storing an instruction set and/or a computer program. When executed by a computer, the instruction set and/or computer program causes the computer to perform the aforementioned method for acquiring a predicted image of a truncated portion. The computer executing the instruction set and/or computer program may be a computer of an MRI system, or may be other devices/modules of the MRI system. In one embodiment, the instruction set and/or computer program may be programmed into a processor/controller of the computer.

Specifically, when executed by the computer, the instruction set and/or computer program causes the computer to: acquire a variation of a first system state parameter during a scanning process of the magnetic resonance imaging system; determine, according to the variation of the first system state parameter, a variation of a second system state parameter on the basis of a function relationship between the first system state parameter and the second system state parameter; and correct the magnetic resonance imaging system on the basis of the variation of at least one of the first system state parameter and the second system state parameter.

The instructions described above may be combined into one instruction for execution, and any of the instructions may also be split into a plurality of instructions for execution. Moreover, the present invention is not limited to the instruction execution order described above.

As used herein, the term "computer" may include any processor-based or microprocessor-based system that includes a system using a microcontroller, a reduced instruction set computer (RISC), an application-specific integrated circuit (ASIC), a logic circuit, and any other circuit or processor capable of performing the functions described herein. The examples above are exemplary only and are not intended to limit the definition and/or meaning of the term "computer" in any way.

The instruction set may include various commands used to instruct the computer serving as a processing machine or the processor to perform specific operations, for example, methods and processes of various embodiments. The instruction set may be in the form of a software program that may form part of one or more tangible, non-transitory computer readable media. The software may be in various forms of, for example, system software or application software. Furthermore, the software may be in the form of a standalone program or a collection of modules, a program module within a larger program, or part of a program module. The software may also include modular programming in the form of object-oriented programming. Processing of input data by the processing machine may be in response to an operator command, or in response to a previous processing result, or in response to a request made by another processing machine.

Some exemplary embodiments have been described above, however, it should be understood that various modifications may be made. For example, suitable results can be achieved if the described techniques are performed in different orders and/or if components in the described systems, architectures, devices, or circuits are combined in different ways and/or replaced or supplemented by additional components or equivalents thereof. Accordingly, other implementations also fall within the protection scope of the claims.

The invention claimed is:

1. A magnetic resonance (MR) imaging system, comprising:
    a magnet configured to generate a main magnetic field about at least a portion of a subject arranged in the MRI system;
    a gradient coil assembly configured to apply at least one gradient field to the main magnetic field;
    a processor, wherein the processor is configured to:
        acquire a variation of a first system state parameter during a scanning process of the magnetic resonance imaging system;
        determine, according to the variation of the first system state parameter, a variation of a second system state parameter on the basis of a function relationship between the first system state parameter and the second system state parameter;
        correct a scan parameter of the MR imaging system during the scanning process on the basis of the variation of at least one of the first system state parameter and the second system state parameter;
        apply a radio-frequency (RF) field to the subject using a RF system based on the corrected scan parameter;
        receive MR signals from the subject; and
        generate a MR image of the subject based on the received MR signals.

2. The system according to claim 1, wherein system state parameters comprises an eddy current, a gradient delay, a phase shift, a gradient temperature, a specific absorption rate, a main magnetic field, and a center frequency, the first system state parameter being any one of the system state parameters, and the second system state parameter being another of the system state parameters.

3. The system according to claim 1, wherein when the first system state parameter comprises the center frequency, the processor is further configured to: acquire a variation of the center frequency during the scanning process of the magnetic resonance imaging system, and determine, according to function relationships between the other system state parameters and the center frequency, variations of the other system state parameters.

4. The system according to claim 3, wherein the acquiring a variation of the center frequency comprises:
    acquiring a reference center frequency, the reference center frequency being a center frequency during pre-scanning;
    acquiring a center frequency of any layer during the scanning process of the magnetic resonance imaging system; and acquiring the variation of the center frequency based on the difference between the center frequency of the any layer and the reference center frequency.

5. The system according to claim 1, wherein the function relationship between the first system state parameter and the second system state parameter is a linear or a non-linear relationship.

6. The system according to claim 1, wherein the function relationship is saved in the magnetic resonance imaging system.

7. The system according to claim 1, wherein the variation of at least one of the first system state parameter and the second system state parameter is displayed on a display unit of the magnetic resonance imaging system.

8. A method for imaging a subject using a magnetic resonance (MR) imaging system comprising:
generating, by a magnet, a main magnetic field about at least a portion of the subject arranged in the MR imaging system;
applying, by a gradient coil assembly, at least one gradient field to the main magnetic field;
acquiring a variation of a first system state parameter during a scanning process of the magnetic resonance imaging system;
determining, according to the variation of the first system state parameter, a variation of a second system state parameter on the basis of a function relationship between the first system state parameter and the second system state parameter;
correcting a scan parameter of the magnetic resonance imaging system during the scanning process on the basis of the variation of at least one of the first system state parameter and the second system state parameter;
applying, by a radio-frequency (RF) system, a RF field to the subject based on the corrected scan parameter;
receiving MR signals from the subject; and
generating a MR image of the subject based on the received MR signals.

9. The correction method according to claim 8, wherein the acquiring the variation of the first system state parameter comprises acquiring a variation of a center frequency and determining, according to function relationships between the other system state parameters and the center frequency, variations of the other system state parameters.

10. A non-transitory computer-readable storage medium, configured to store a computer program, wherein when the computer program is executed by a computer, the computer program causes the computer to perform the correction method of a magnetic resonance imaging system according to claim 9.

11. A non-transitory computer-readable storage medium, configured to store a computer program, wherein when the computer program is executed by a computer, the computer program causes the computer to perform the correction method of a magnetic resonance imaging system according to claim 8.

* * * * *